July 6, 1926.
R. T. GRIFFITHS
1,591,373
ACIDPROOF DRUM AND METHOD OF MAKING SAME
Filed Nov. 27, 1925
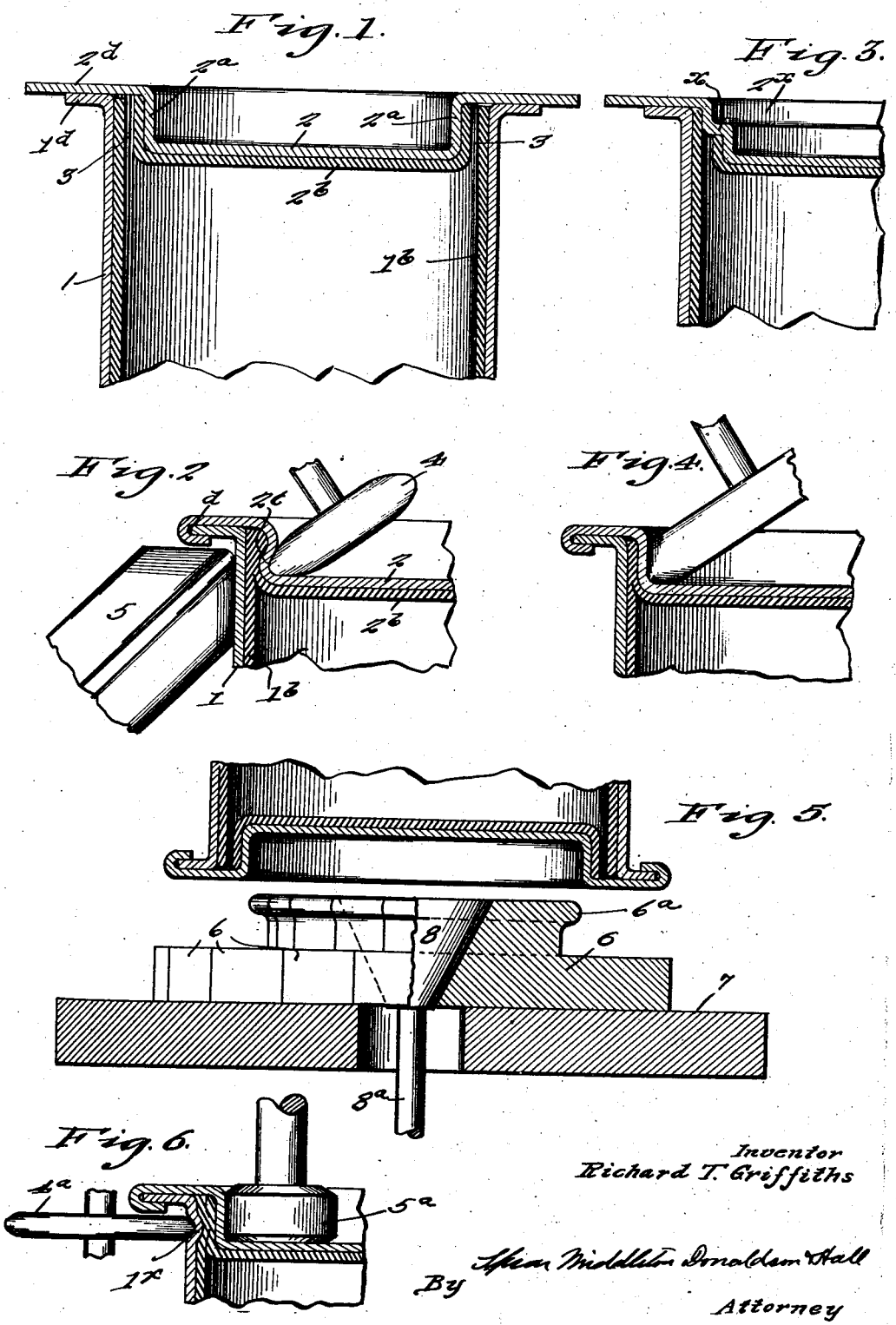
Inventor
Richard T. Griffiths
By
Attorney Patented July 6, 1926.

1,591,373

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

ACID-PROOF DRUM AND METHOD OF MAKING SAME.

Application filed November 27, 1925. Serial No. 71,626.

My present invention relates to improvements in portable cylindrical acid-proof shipping drums designed for shipping acids.

The rules of the Interstate Commerce Commission forbid the shipping of such material in drums having removable heads, and difficulty has been experienced in producing a satisfactory drum of the fixed head type.

The present invention aims to provide a drum having a non-removable head, and a method of making the same whereby a strong, durable article will be produced, and one in which all danger of separation or displacement of the lining will be prevented, and which drum may be expeditiously and economically produced.

In order that my invention may be better understood, reference is made to the accompanying drawings, in which:—

Figure 1 is a central vertical section through the drum showing the body and ends in loosely assembled position.

Fig. 2 is a sectional detail showing a portion of the drum only, and cooperating pressing and swaging rollers to illustrate the action of clamping the lining layers between a head and corresponding end of the body.

Fig. 3 is a sectional detail view of a portion of a container illustrating a modified form with the parts in a position corresponding to that of Fig. 1.

Fig. 4 is a view of the parts shown in Fig. 3, as they would appear after the swaging or expanding action.

Fig. 5 is a view illustrating a modified manner of expanding the cylindric wall of the head of a container such as shown in Fig. 1.

Fig. 6 is a view showing how, as an alternative, the clamping action may be accomplished by swaging an inwardly extending bead in the container wall.

In proceeding according to my invention I provide a substantially cylindrical metallic container body 1 and a head 2 of similar material, having a cylindric portion $2^a$ adapted to be inserted within the end of the container body. Each of these is provided with a lining of non-metallic acid-proof material, preferably of rubber, secured to the corresponding container wall in any suitable or desired manner. These linings are preferably made of rubber and may have uncured surfaces.

The lining layer $2^b$ of the head is extended up over the cylindric head portions $2^a$ so that when a head is inserted within an end of the container body, the portion of the lining covering the cylindric part of the head, and the lining $1^b$ of the body overlap each other. The external diameter of the cylindrical portion $2^a$ is made sufficiently less than the internal diameter of the drum end to provide a space between the opposed metallic walls which is more than the combined thickness of the two overlying layers, so that when a head is inserted in or assembled with the body, as shown in Fig. 1, an annular space 3 is provided between the juxtaposed faces of the head and body linings. This enables the cylindric portion of the head to be inserted in the body end without danger of damaging or displacing the coacting lining portions.

After a head has been inserted, as shown in Fig. 1, one of the metal walls (cylindrical wall of the head or end wall of the container) is subjected to a swaging or pressing action whereby it is pressed towards the other, preferably in the form of an annular bead which firmly clamps the overlapping portions of the lining together and between the juxtaposed metal walls. This swaging action may be readily accomplished by means such as shown conveniently in Fig. 2, comprising a relatively sharply convex faced roller 4 for operating on the inner cylindrical head wall, and a pressure receiving or thrust sustaining roller 5 acting against the outer surface of the container wall in opposition to the roller 4. By this means a bead $2^c$ is swaged outwardly in the cylindric portion of the head, which binds or clamps the overlapping or juxtaposed portions of the linings firmly together to produce an acid-tight joint and a firm connection of the linings at this point, which absolutely precludes any sagging away of the lining from the container walls.

Any suitable means may be provided for permanently securing the metal heads to the container bodies, but a convenient, economical and durable method of accomplishing this is to provide the body with outwardly turned end flanges 1ᵈ, and the heads with corresponding marginal flanges 2ᵈ which are rolled together or interlocked to form a crimped joint, as indicated at *d* in Fig. 2. In practice the seam *d* is preferably formed prior to the action of the rolls 4—5.

The rolling action of Fig. 2 is simple, economical and efficacious, and acts progressively, but the same can be accomplished by expander means, as shown in Fig. 5. In this I provide an annular series of expander segments 6 having bead forming ribs 6ª, the segments being mounted for radial movement on a support 7 and provided with tapered inner walls designed to coact with a cone-shaped expander member 8 which may be operated by a rod 8ª by any suitable means.

A further modification of container head is shown in Fig. 3, in which the head 2ˣ is provided with a shoulder *x*, the reduced portion for the marginal edge of the head lining being below this shoulder. In this form the cylindric portion of the head above the shoulder absolutely insures the head being inserted without the head lining coming in contact with the wall lining. After the head has been inserted, as shown in Fig. 3, the shoulder may be rolled down and so as to secure a clamping effect, as illustrated in Fig. 4.

Instead of having the rolling or expanding effected through the intermediary of the cylindrical wall of the head, I may, as shown in Fig. 6, secure the same effect by rolling an annular bead or channel 1ˣ in the body wall through the use of pressure and thrust sustaining rollers 4ª and 5ª.

While I have referred herein to the container as a cylindric one, it will be understood that it need not be absolutely circular, nor need it be directly cylindrical throughout between the ends, the only thing being necessary is that the walls of the end portions of the drum and the corresponding walls of the heads shall be accurately spaced apart at all points, and be so spaced as to support the margins of the head linings in the position to be out of contact with the body linings during assembly.

Having thus described my invention what I claim is:—

1. An acid-proof metal drum comprising a body wall having an open end and a lining of rubber composition, and a head having a cylindrical wall portion projecting within the end of the body wall, said head having a lining of rubber composition extending over the cylindric wall portion, one of said juxtaposed wall portions being deformed and compressing the juxtaposed lining portions between its deformed portion and the corresponding portion of the other wall.

2. An acid-proof metal drum comprising an open ended body having a lining of rubber composition, and heads having cylindrical portions projecting within the ends of the body, said heads having linings of rubber composition acid-proof material extending over the cylindric portions, the juxtaposed portions of the body and head linings lying between the opposed walls of the body and heads, said heads having projecting marginal portions which are interlocked with the respective ends of the body, and one of said opposed walls being deformed towards the other wall thereby holding the juxtaposed lining portions pressed into substantially homogeneous union.

3. An acid-proof metal drum comprising an open ended tubular body having a lining of sheet rubber composition, and heads having cylindric portions projecting within the ends of the body whereby the heads and bodies provide overlapping parts, said heads having linings of sheet rubber composition which extend over the cylindric portions, one of said overlapping parts having an annular rounded bead projecting towards the other part and compressing the overlapping sheet portions together on a line intermediate the height of the cylindric portion of the head.

In testimony whereof, I affix my signature.

RICHARD T. GRIFFITHS.